United States Patent
Galzin et al.

(10) Patent No.: US 12,202,609 B2
(45) Date of Patent: Jan. 21, 2025

(54) AIR CONDITIONING SYSTEM FOR AN AIRCRAFT CABIN, COMPRISING MEANS FOR REHEATING THE WATER COLLECTED BY THE WATER EXTRACTION LOOP

(71) Applicant: LIEBHERR-AEROSPACE TOULOUSE SAS, Toulouse (FR)

(72) Inventors: Guillaume Galzin, Toulouse (FR); Jean-Raymond Blary, Toulouse (FR); David Lavergne, Toulouse (FR)

(73) Assignee: LIEBHERR-AEROSPACE TOULOUSE SAS, Toulouse (FR)

( * ) Notice: Subject to any disclaimer, the term of this patent is extended or adjusted under 35 U.S.C. 154(b) by 627 days.

(21) Appl. No.: 17/435,469

(22) PCT Filed: Feb. 27, 2020

(86) PCT No.: PCT/FR2020/050386
§ 371 (c)(1),
(2) Date: Sep. 1, 2021

(87) PCT Pub. No.: WO2020/178504
PCT Pub. Date: Sep. 10, 2020

(65) Prior Publication Data
US 2022/0048635 A1 Feb. 17, 2022

(30) Foreign Application Priority Data

Mar. 1, 2019 (FR) ...................................... 1902147

(51) Int. Cl.
*B64D 13/08* (2006.01)
*B64D 13/04* (2006.01)
*B64D 13/06* (2006.01)

(52) U.S. Cl.
CPC .............. *B64D 13/08* (2013.01); *B64D 13/04* (2013.01); *B64D 2013/0611* (2013.01); *B64D 2013/0618* (2013.01); *B64D 2013/0662* (2013.01)

(58) Field of Classification Search
CPC .................... B64D 13/08; B64D 13/04; B64D 2013/0611; B64D 2013/0618; B64D 2013/0662
See application file for complete search history.

(56) References Cited

U.S. PATENT DOCUMENTS

| | | | |
|---|---|---|---|
| 4,014,179 A | 3/1977 | Iles et al. | |
| 4,352,273 A | 10/1982 | Kinsell | |
| 6,148,622 A | 11/2000 | Sanger | |
| 10,457,399 B2 * | 10/2019 | Bammann | B64D 13/06 |

(Continued)

FOREIGN PATENT DOCUMENTS

EP 3945031 A1 * 2/2022 ............. B64D 13/06

*Primary Examiner* — Gordon A Jones
(74) *Attorney, Agent, or Firm* — CRGO Global; Steven M. Greenberg

(57) ABSTRACT

Air conditioning system for a cabin (10) of an aircraft, comprising: an air bleed device; an air cycle turbine engine (12); at least one main cooling exchanger (16); a water extraction loop (30); and a pipe (26) for distributing water extracted by said extraction loop (30), characterized in that said system further comprises means (40) for heating the water extracted by the water extraction loop so as to be able to spray the water into a ram-air channel (22) which supplies said main exchanger (16).

12 Claims, 3 Drawing Sheets

(56) References Cited

U.S. PATENT DOCUMENTS

| | | | |
|---|---|---|---|
| 2013/0061617 A1* | 3/2013 | Borghese | F28F 1/04 |
| | | | 62/402 |
| 2017/0152050 A1* | 6/2017 | Klimpel | F25B 13/00 |
| 2019/0135440 A1* | 5/2019 | Bruno | B64D 13/06 |
| 2020/0130849 A1* | 4/2020 | Hennig | B64D 13/08 |
| 2022/0034592 A1* | 2/2022 | Maynard | F28F 21/084 |

* cited by examiner

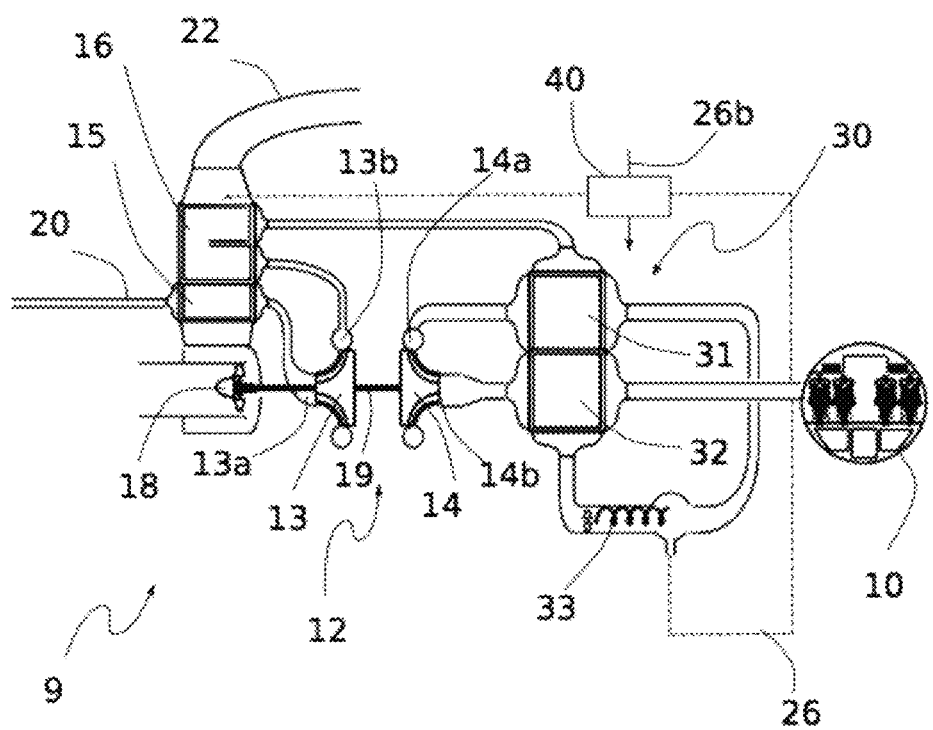
[Fig. 1]

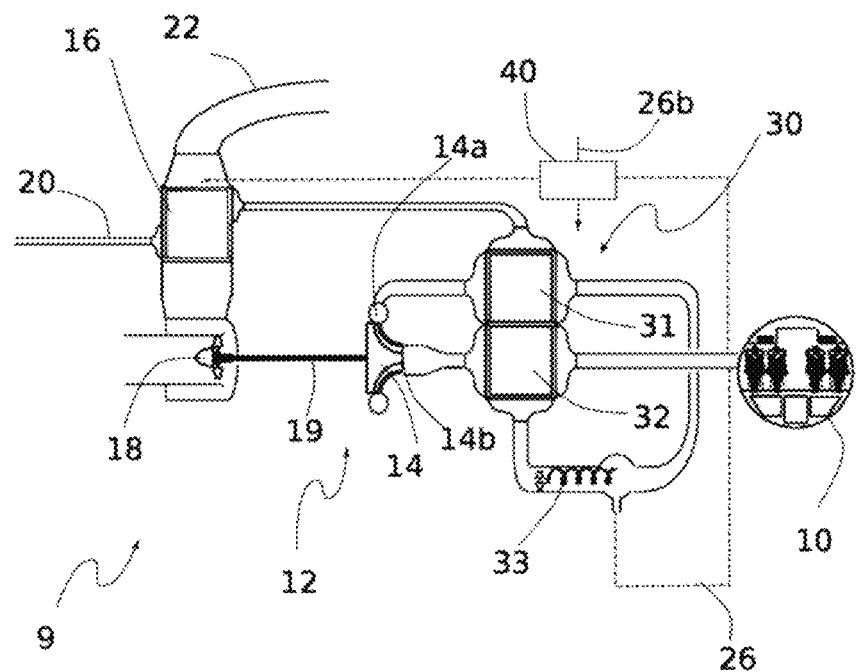
[Fig. 2]
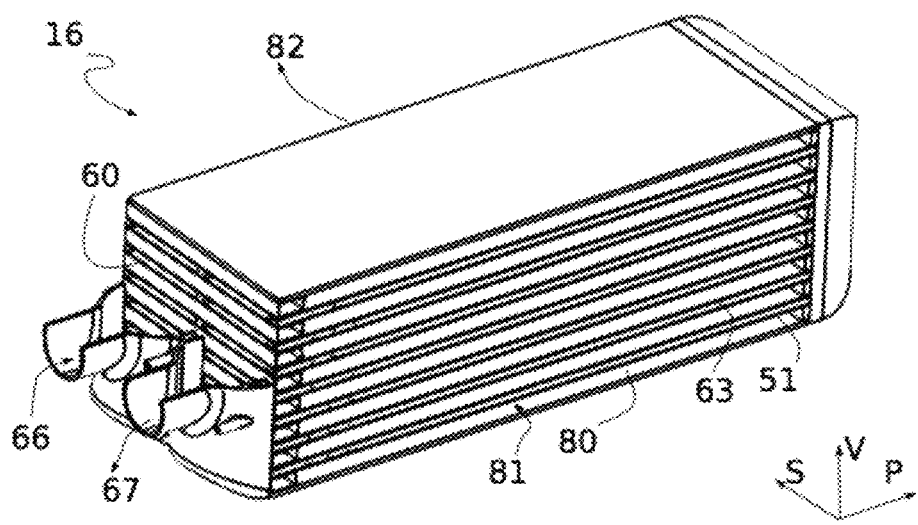
[Fig. 3]

[Fig. 4]
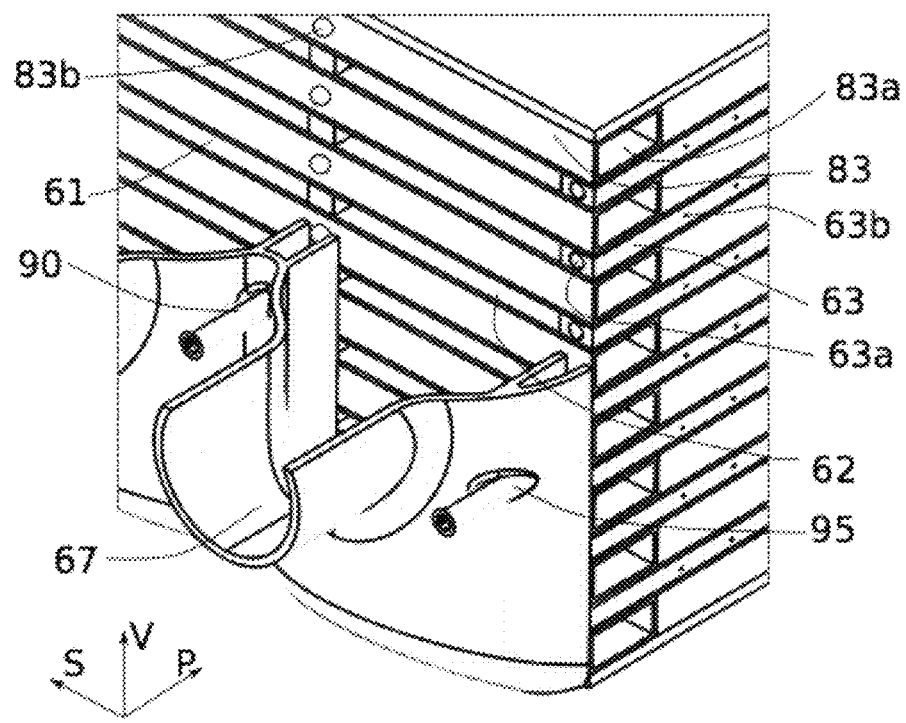
[Fig. 5]
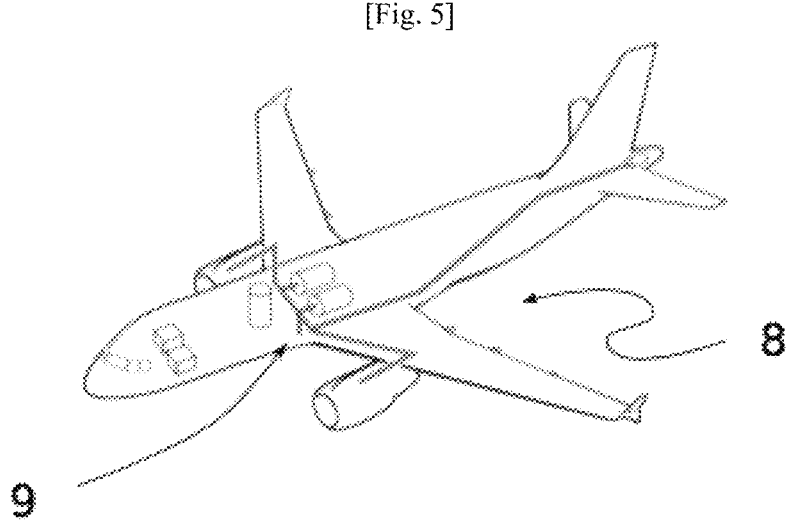

AIR CONDITIONING SYSTEM FOR AN AIRCRAFT CABIN, COMPRISING MEANS FOR REHEATING THE WATER COLLECTED BY THE WATER EXTRACTION LOOP

CROSS-REFERENCE TO RELATED APPLICATIONS

This application is a § 371 national phase entry of International Application No. PCT/FR2020/050386, filed Feb. 27, 2020, which claims priority to French Patent Application No. 1902147, filed Mar. 1, 2019.

TECHNICAL FIELD OF THE INVENTION

The invention relates to an air conditioning system for a cabin of an air or rail transport vehicle. The invention relates more particularly to an air conditioning system comprising a water extraction loop and means for heating the water collected by this loop.

TECHNICAL BACKGROUND

Throughout the text, the term "cabin" denotes any interior space of an air or rail transport vehicle of which the pressure and/or temperature of the air must be controlled. This may be a cabin for passengers, the pilot's cockpit of an aircraft, a hold, and in general any area of the vehicle which requires air at a controlled pressure and/or temperature. The term "turbine" denotes a rotary device for using the kinetic energy of the air to rotate a shaft supporting the blades of the turbine. The term "compressor" denotes a rotary device for increasing the pressure of the air which said device receives at the inlet.

An air conditioning system for a cabin of a transport vehicle, such as an aircraft, comprises, in a known manner, a device for bleeding compressed air from at least one compressor of an engine of the aircraft (such as a propulsion engine or an auxiliary engine of the aircraft).

Such a known air conditioning system also comprises an air cycle turbine engine comprising at least one compressor and a turbine mechanically coupled to one another, said compressor comprising an air inlet connected to said compressed-air bleed device, and an air outlet, and said turbine comprising an air inlet and an air outlet that is connected to said cabin in order to be able to supply said cabin with air at a controlled pressure and temperature.

According to an alternative, the compressor of the air cycle turbine engine is directly supplied with ambient air drawn from outside the aircraft, and the air is compressed directly by the compressor of the air cycle turbine engine.

Whatever the mode of compressed-air supply of the system, said system generally also comprises at least one heat exchanger, referred to as the main cooling exchanger, which is arranged in a channel for the circulation of ram air drawn from outside the aircraft, between said air outlet of said compressor and said air inlet of said turbine, said main exchanger comprising a primary circuit supplied with a flow of hot air from said compressor, and a secondary circuit supplied with said ram air, which forms a flow of cold air for cooling said flow of hot air.

Finally, an air conditioning system also generally comprises a water extraction loop that is arranged between said main heat exchanger and said turbine and is designed to extract water from the flow of hot air cooled by said main exchanger which supplies said turbine.

Some systems also include arranging a pipe, for distributing water extracted by said extraction loop, between said water extraction loop and water sprayers that are housed in said ram-air channel, far upstream of said main exchanger, and are designed to be able to spray this water extracted by said water extraction loop against the ram-air flow of said ram-air channel in order to promote the evaporation of said water in the air flow before the air enters the main cooling exchanger.

This injection of liquid water in the form of droplets into the ram-air circulation channel, more commonly referred to as ambient-air channel or ram-air channel, upstream of the cooling exchanger, makes it possible to lower the temperature of the air at the inlet of the cold pass of the cooling exchanger. This water, as it evaporates, absorbs heat and therefore allows the temperature of the air to be lowered. This water is generally injected at a temperature of approximately 20° C., which is the temperature of the water separator of the water extraction loop.

Patent document US200911784 in the name of the applicant describes such an air conditioning system, for example. A system according to this embodiment is now widely used in a number of aircraft.

The inventors have nevertheless sought to improve such an air conditioning system, and in particular to improve the cooling performance of the hot pass of the main cooling exchanger.

Aims of the Invention

The invention aims to provide an air conditioning system for a cabin of a transport vehicle, such as an aircraft, which system makes it possible to improve the cooling performance of the hot pass of the main cooling exchanger.

The invention also aims to provide, in at least one embodiment of the invention, an air conditioning system suitable for compact ram-air circulation channels, such as those used for rail transport vehicles.

DISCLOSURE OF THE INVENTION

To this end, the invention relates to an air conditioning system for a cabin of an aircraft, comprising:
- a device for bleeding air from an air source;
- an air cycle turbine engine comprising at least one turbine and an energy-consuming wheel (18) mechanically coupled to one another, said turbine comprising an air inlet and an air outlet that is connected to said cabin in order be able to supply said cabin with air at a controlled pressure and temperature;
- at least one heat exchanger, referred to as the main cooling exchanger, which is arranged in a channel for the circulation of ram aim drawn from outside the aircraft, between said air bleed device and said air inlet of said turbine, said main exchanger comprising a primary circuit supplied with a flow of hot air from said air bleed device and a secondary circuit supplied with said ram air, which forms a flow of cold air for cooling said flow of hot air;
- a water extraction loop that is arranged between said main heat exchanger and said turbine and is designed to extract water from the flow of hot air cooled by said main exchanger which supplies said turbine; and
- a pipe for distributing water extracted by said extraction loop, which pipe extends between said water extraction loop and said ram-air channel, upstream of said main exchanger, in order to be able to spray the water extracted by said water extraction loop, referred to as the spray water, into the ram-air flow of said ram-air channel.

The air conditioning system according to the invention is characterized in that it further comprises means for heating the spray water, which means are arranged between said water extraction loop and said ram-air channel, upstream of said main cooling exchanger, so as to allow evaporation of the water sprayed into said ram-air channel, which helps to cool the ram air of said primary circuit of the main exchanger and to ensure cooling of the hot air of said primary circuit of said main exchanger.

The air conditioning system according to the invention therefore has the specific feature of heating the water extracted by the water extraction loop before spraying said water into the ram-air channel. The inventors have realized that this heating of the water makes it possible to optimize the efficiency of the evaporation of the water in the ram-air channel and therefore to lower the temperature of the ambient air circulating in the ram-air channel. In particular, the water heated by the heating means evaporates more quickly in the ram-air channel, and more completely than the same water when unheated, with an identical design.

The inventors have in particular determined that the water extracted in a water extraction loop is generally injected into the ram-air channel at a temperature of 20° C. By providing means for heating this extracted water to reach, for example, a temperature of 60° C., the evaporation time is divided by a factor of 13 due to the change in the saturated vapor pressure.

Advantageously and according to the invention, said air cycle turbine engine further comprises at least one compressor mechanically coupled to said turbine and to said energy-consuming wheel, said compressor comprising an air inlet connected to said air bleed device, and an air outlet connected to said main cooling exchanger, said primary circuit of said main exchanger being supplied with a flow of hot air from said compressor.

This advantageous alternative makes it possible to compress the air from the air bleed device by the compressor of the turbine engine before cooling by the main exchanger. In other words, this alternative of the invention makes it possible to have a compression stage within the air cycle turbine engine and therefore to receive uncompressed air drawn from outside the aircraft, or to form a second compression stage in the case where the air supplied to the compressor is already compressed air (if necessary, this makes it possible to provide a pressure boost).

Advantageously and according to the invention, said means for heating the water from said water distribution pipe comprise at least one heat exchanger, referred to as the spray exchanger, comprising a cold circuit supplied with said water from said distribution pipe, and a hot circuit supplied with a source of hot fluid.

According to this advantageous alternative, the water extracted by the water extraction loop passes through an exchanger, referred to as the spray exchanger, which is designed to be able to conduct heat exchanges between a cold pass supplied with the water extracted by the water extraction loop, and a hot pass supplied with a source of hot fluid.

Advantageously and according to this alternative, said hot fluid circuit of said spray exchanger is a fuel circuit, an oil circuit, a circuit of a heat transfer fluid or an air circuit of the aircraft.

According to this advantageous alternative, the source of hot fluid which supplies the spray exchanger is either a fuel circuit, or an oil circuit, or a circuit of a heat transfer fluid, or an air circuit of the aircraft. In particular, an aircraft comprises a number of fluid circuits having temperatures higher than the temperature of the water extracted by the water extraction loop, which is generally close to 20° C. Thus, any fluid circuit having a temperature higher than the temperature of the water collected by the water extraction loop can form the hot pass of the spray exchanger.

Advantageously and according to this alternative, in the case where the hot fluid circuit of the spray exchanger is an air circuit of the aircraft, this air circuit is advantageously the primary air circuit of the main exchanger.

This alternative advantageously makes it possible to further cool the hot pass of the main exchanger by using the water circuit of the spray exchanger as a cold pass for cooling the hot pass of the main exchanger.

This alternative therefore has a double advantage of being able to cool the cold pass of the main exchanger by spraying heated water at the inlet of the exchanger and of sub-cooling the hot pass of the main exchanger by means of the spray exchanger.

According to another alternative, the water heating means comprise an electrical resistor or a heat pump system or a Peltier effect system. In general, any type of means designed to heat water can be used within the framework of the invention to heat the water.

Advantageously and according to the invention, said spray exchanger is integrated within said main cooling exchanger.

According to this advantageous alternative, the spray exchanger and the main cooling exchanger are formed integrally.

This advantageous alternative makes it possible in particular to create a ram-air channel that is shorter, while limiting the space necessary for spraying water into the air channel. A shorter ram-air circuit of this kind is in particular suitable for rail vehicles.

Advantageously and according to the invention, said main cooling exchanger comprises:
  a plurality of channels, referred to as secondary channels, placed one on top of the other and intended for the circulation of said cold air, each extending in the same direction, referred to as the secondary direction, between an air inlet, referred to as the secondary air inlet, and an air outlet, referred to as the secondary air outlet;
  a plurality of channels, referred to as primary channels, for the circulation of said hot air, each interposed between two secondary channels and extending in the same direction, referred to as the primary direction, which is different from said secondary direction, between an air inlet, referred to as the primary air inlet, and an air outlet, referred to as the primary air outlet, so as to allow heat exchanges between the primary air of said primary channels and the secondary air of said secondary channels;
  water circulation channels, each extending adjacently to a secondary channel in said secondary direction in the vicinity of the primary air outlets, between a water inlet, which is fluidically connected to said water distribution pipe, and a water outlet, so as to allow this water to be heated by heat exchanges with said primary air flow of said primary channels; and
  water-spray micro-perforated hollow bars, each extending adjacently to a primary channel in said primary direction, between a water inlet, which is fluidically connected to at least one water outlet of said water circulation channels, and water-spray micro-perforations leading toward the secondary air inlets, so as to allow evaporation of the heated water sprayed at the inlet of said secondary channels, which thus helps to cool the secondary air flow at the inlet of the exchanger.

Advantageously and according to the invention, said water extraction loop comprises:
- a condenser comprising a primary air circuit supplied with the air flow at the outlet of said main cooling exchanger, in thermal interaction with a secondary air circuit supplied with an air flow from said turbine, to allow condensation of said air flow of said primary circuit; and
- a water extractor that is arranged at the outlet of said condenser and is designed to be able to recover the water condensed by the condenser and to feed said water to said water distribution pipe.

According to this alternative of the invention, the extraction loop is intended for drying the air before said air is injected into the turbine of the air cycle turbine engine in order to be expanded and distributed toward the cabin of the aircraft (via a mixing chamber).

Advantageously and according to the invention, said extraction loop further comprises a heater comprising a primary air circuit supplied by said primary air circuit of said main cooling exchanger and supplying said primary air circuit of said condenser, in thermal interaction with a secondary circuit supplied with air from said water extractor, so as to allow the compressed air supplying the primary circuit of said heater to be heated.

This advantageous alternative makes it possible to increase the temperature of the air which supplies the turbine of the air cycle machine, and this makes it possible to vaporize any drops of water not captured by the water extractor and therefore protects the turbine, while helping to improve the performance of the expansion turbine of the air cycle turbine engine.

Advantageously and according to the invention, said device for bleeding compressed air from an engine of the aircraft is a device for bleeding air from a propulsion engine of the aircraft or a device for bleeding from an auxiliary engine of the aircraft.

As indicated above, according to another alternative, there is nothing to preclude directly supplying the compressor of the air cycle turbine engine with ambient air drawn directly from outside the vehicle by means of a scoop and/or providing an intermediate compressor arranged between the drawing scoop and the compressor of the air cycle turbine engine, if necessary.

The invention also relates to an air or rail transport vehicle comprising a cabin and to an air conditioning system for this cabin, characterized in that said air conditioning system for the cabin is a system according to the invention.

The advantages of an air-conditioning system according to the invention apply, mutatis mutandis, to an air or rail transport vehicle according to the invention.

The invention also relates to an air conditioning system and a vehicle that are characterized in combination by all or some of the features mentioned above or below.

LIST OF DRAWINGS

Further aims, features and advantages of the invention will become apparent upon reading the following description, which is provided solely by way of non-limiting example, and which refers to the accompanying drawings, in which:

FIG. 1 is a schematic view of an air conditioning system according to an embodiment of the invention;

FIG. 2 is a schematic view of an air conditioning system according to another embodiment of the invention;

FIG. 3 is a schematic perspective view of a main exchanger for cooling an air conditioning system according to an embodiment of the invention;

FIG. 4 is a schematic view of a detail of the main cooling exchanger of FIG. 3; and FIG. 5 is a schematic perspective view of an aircraft in accordance with an embodiment according to the invention.

DETAILED DESCRIPTION OF AN EMBODIMENT OF THE INVENTION

For the sake of illustration and clarity, scales and proportions are not strictly adhered to in the drawings. Moreover, identical, similar, or analogous elements are denoted using the same reference signs throughout the drawings.

FIG. 1 schematically shows an air conditioning system 9 for a cabin 10 of an aircraft 8, comprising an air cycle turbine engine 12 that comprises a compressor 13 and an expansion turbine 14 mechanically coupled to one another by a mechanical shaft 19. This mechanical shaft 19 also drives a fan 18 which forms an energy-consuming wheel, the role of which is described below.

The compressor 13 comprises an air inlet 13a connected to a device for bleeding air from an air source (not shown in the drawings for the sake of clarity) by means of a primary cooling exchanger, also referred to as PHX (for primary heat exchanger) exchanger 15 throughout the following, and a pipe 20 fluidically connecting the air bleed device and the PHX exchanger 15.

In other words, the air from the air bleed device, which is for example a device for bleeding air from a compressor of a propulsion engine of the aircraft or a device for bleeding air from a compressor of an auxiliary engine of the aircraft, or a device for drawing air from a scoop of the aircraft, whether or not associated with an intermediate compressor, supplies the compressor 13 of the air cycle turbine engine 12 after passing through a primary PHX exchanger 15. This PHX exchanger 15 comprises a hot pass formed by the air fed from the air bleed device via the pipe 20, and a cold pass supplied with air at ram pressure, which circulates in a channel 22 for the circulation of ram air, hereinafter referred to as the ram-air channel.

The ram-air circulation in the ram-air channel 22 is provided by the fan 18 mounted on the shaft 18 of the air cycle turbine engine, which shaft extends into the ram-air channel 22. According to other alternatives, the fan 18 can be separate from the shaft 19 and rotated by an independent electric motor.

The compressor 13 also comprises an air outlet 13b fluidically connected to a main cooling exchanger, also referred to by the acronym MHX (main heat exchanger) 16 throughout the following, which is arranged in the channel 22 for the circulation of ram air drawn from outside the aircraft.

This MHX exchanger 16 comprises a hot primary circuit supplied with the air flow from the compressor 13, and a cold secondary circuit, in thermal interaction with the primary circuit, supplied with the ram air circulating in the ram-air channel 22. In other words, the air from the compressor 13 is cooled, in the MHX exchanger 16, by the ram air circulating in the ram-air circulation channel 22.

The expansion turbine 14 of the air cycle turbine engine 12 comprises an air inlet 14a supplied with air from the MHX exchanger 16 having passed through a water extraction loop 30, which will be described below, and an air outlet 14b that is connected to said cabin 10 in order to be able to supply said cabin with air at a controlled pressure and temperature.

The water extraction loop 30 comprises, according to the embodiment of the drawings, a heater 31 comprising a primary air circuit supplied with air from the main MHX exchanger 16, in thermal interaction with a secondary circuit that is supplied with air from a water extractor 33 and is intended for supplying the inlet 14a of the expansion turbine.

The water extraction loop 30 also comprises a condenser 31 comprising a primary air circuit supplied with the air flow at the outlet of the heater 31, in thermal interaction with a secondary air circuit supplied with the air flow from the expansion turbine 14, to allow condensation of the air flow of the primary circuit.

Finally, the water extraction loop also comprises a water extractor 33 that is arranged at the outlet of the condenser 32 and is designed to be able to recover the water condensed by the condenser and feed said water to a water distribution pipe 26 (shown schematically as a dotted line in FIGS. 1 and 2).

This water distribution pipe 26, also referred to throughout the text as spray pipe, extends between the water extractor 33 and the ram-air channel 22, upstream of the main MHX exchanger 16, in order to be able to spray the water recovered by the water extractor 33 into the ram-air flow of the ram-air channel 22.

FIG. 2 shows another embodiment of the invention. The main difference from the embodiment of FIG. 1 relates to the air cycle turbine engine 12. In FIG. 2, the turbine engine 12 only has the expansion turbine 14 and the fan 18 mounted on the shaft 19. In other words, according to this embodiment, the turbine engine 12 does not comprise a compressor mounted on the mechanical shaft 19. In addition and according to this embodiment, the air from the air bleed device (not shown in the drawings) directly supplies the main MHX exchanger 16 via the pipe 20 (which therefore no longer connects the air bleed device to the PHX exchanger 15 as for the embodiment of FIG. 1, but connects said device to the main MHX exchanger 16 directly). This embodiment therefore also does not have a primary PHX exchanger 15. The air which supplies the main MHX exchanger 16 is therefore, according to this embodiment, air that is already compressed. This air is, for example, air bled from a propulsion engine of an aircraft or air treated by an upstream compressor.

Whatever the embodiment considered (turbine engine with compressor or without compressor), the air conditioning system according to the invention also comprises means 40 for heating the spray water flowing in the spray pipe 26. These means 40 for heating the spray water are formed, for example and as shown in FIG. 1, of a heat exchanger, referred to as the spray exchanger, comprising a cold circuit supplied with water from the spray pipe 26 and a transverse hot circuit 26b supplied with a source of hot fluid. This hot circuit 26b can be of any type. It may for example be a bypass of a fuel circuit supplying a propulsion engine of the aircraft, or a bypass of an oil circuit for lubricating an engine part of the aircraft or a bypass of an air circuit of the air conditioning system of the aircraft. Any type of heat exchanger for a hot fluid and a cold liquid fluid can be used to form the means 40 for heating the spray water.

In general, this hot circuit can be selected according to the design of the air conditioning system and the ease of diverting a hot circuit to form the hot pass of the spray exchanger.

The presence of such a spray exchanger on the spray pipe 26 therefore allows the water circulating in the spray pipe 26 to be heated and therefore the efficiency of the evaporation of the water in the ram-air channel 22 to be optimized. This helps in particular to make it possible to lower the temperature of the ambient air circulating in the ram-air channel 22 and therefore to improve the cooling of the air from the compressor 13, which air forms the hot pass of the MHX exchanger 16. The water heated by the heating means 40 evaporates more quickly and completely in the ram-air channel 22.

According to a particular embodiment and as shown in FIGS. 3 and 4, the heating means 40 are integrated into the MHX exchanger 16.

To this end, the MHX exchanger 16 comprises a plurality of parallel plates 51 which are placed one on top of the other and which alternately define therebetween primary channels 60 and secondary channels 80, i.e., each primary channel 60 is nested between two secondary channels 80. Preferably, the first channel starting from the bottom of the exchanger is a secondary channel 80, on top of which a transverse primary channel 60 is placed, on top of which a second secondary channel 80 is placed, on top of which a second transverse primary channel is placed, and so on, until the last channel, which is preferably also a secondary channel. Of course, the stacking order of the channels can be different without changing the principle of the invention.

Each primary channel 60 has, according to the embodiment of FIGS. 3 and 4, a general U shape and extends between a primary air inlet 61 and a primary air outlet 62. Each leg of the U extends in a primary direction P, as shown in FIGS. 3 and 4 by the axis system (P, S, V), where P represents the primary direction, S represents the secondary direction and V represents the vertical defined by gravity.

Each secondary channel 80 extends between a secondary air inlet 81 and a secondary air outlet 82 in the secondary direction S.

In other words, the primary channels 60 and the secondary channels 80 are generally perpendicular to each other and nested in pairs so as to form heat exchange regions at each interface of a secondary channel with a leg of the primary channel.

Each primary channel 60 is further delimited by closure bars 63, also referred to as primary closure bars, which interconnect the parallel plates 51 and extend on each side of the primary channel 60 in the primary direction P.

Each secondary channel 80 is also delimited by closure bars 83, also referred to as secondary closure bars, which interconnect the parallel plates and extend on each side of the secondary channel 80, in the secondary direction S.

The primary closure bars 63 extend between a primary water inlet 63a and water-spray openings 63b. In addition, each primary closure bar 63 comprises an internal channel which extends in the primary direction P, leading into the water inlet 63a and fluidically connecting the micro-perforations formed by the spray openings 63b. Thus, the water which supplies the inlet 63a of the closure bars 63 is sprayed through the spray openings 63b into the air flow which feeds the secondary channels 80.

The secondary closure bars 83 extend between a secondary water inlet 83a and a secondary water outlet 83b. The closure bars 83 are arranged in the vicinity of the primary air outlets 62 such that the water which supplies the inlet 83*a* of each closure bar is heated by the air which circulates in the primary channels 60.

The exchanger according to the embodiment of the drawings further comprises a water collector 90 into which the outlets 83*b* of all the secondary closure bars 83 lead.

The exchanger according to the embodiment of the drawings also comprises a water distributor 95 which is fluidically connected to the water collector 90 by a hose (not shown in the drawings for the sake of clarity) that leads into the water inlets 63*a* of the primary closure bars 63.

Thus, all the water collected by the collector 90 and heated by the heat exchanges between the secondary closure bars 83 and the primary channels 60 is distributed in the primary closure bars 63 such that this heated water can be sprayed into the secondary air flow which supplies the exchanger.

The exchanger according to this embodiment also comprises a common primary air inlet 66 leading into the primary air inlets 61 of the primary channels 60, and a common air outlet 67 for primary air into which the primary air outlets 62 of the primary channels 60 lead.

The general operating principle of exchanger 16 is therefore as follows. Hot air from an air bleed device of an aircraft supplies the inlet 66 of the exchanger. This hot air is then distributed to the primary channels 60. Within each U-shaped channel 60, the hot air circulates in a leg of the U in the primary direction P, turns around at a rounded connection piece connecting the two parallel legs of the U, then circulates in the opposite direction in the primary direction P so as to lead into the air outlet 62 which supplies the common primary air outlet 67.

In addition, cold air, from a draw of air from outside the aircraft, supplies the air inlets 81 of the primary channels 80. This air circulates in the secondary channels 80, which extend in the secondary direction S, so as to exit through the outlets 82.

Since the primary channels 60 are nested together with the secondary channels 80, heat exchanges take place between the flow of hot air and the flow of cold air such that the air flow which leaves the common outlet 67 is cooled compared with the inlet air.

At the same time, water is injected into the inlets 83*a* of the secondary closure bars. This water comes from a water extraction loop of an air conditioning system as shown schematically in FIGS. 1 and 2.

This water is heated by heat exchanges between the secondary closure bars and the primary air flow. This heated water is collected by the water collector 90 which is connected to the water distributor 95. This heated water is therefore sprayed into the flow of cold air which supplies the secondary channels 80.

This increase in water temperature therefore makes it possible to accelerate the evaporation time and therefore to limit the path that is necessary between the water spraying and the inlet of the exchanger.

An air conditioning system according to this embodiment is therefore particularly effective insofar as it allows better cooling of the air while greatly limiting the size of the system.

The invention claimed is:

1. An air conditioning system for a cabin of an aircraft, comprising:
   an air bleeder adapted to bleed air from an air source;
   an air cycle turbine engine comprising at least one turbine and an energy-consuming wheel mechanically coupled to one another, said turbine comprising an air inlet and an air outlet that is connected to said cabin in order to be able to supply said cabin with air at a controlled pressure and temperature;
   at least one heat exchanger, comprising a main cooling exchanger, which is arranged in a channel for circulation of ram air drawn from outside the aircraft, between said air bleeder and said air inlet of said turbine, said main exchanger comprising a primary circuit supplied with a flow of hot air from said air bleeder, and a secondary circuit supplied with said ram air, which forms a flow of cold air for cooling said flow of hot air;
   a water extraction loop that is arranged between said main exchanger and said turbine and is designed to extract water from the flow of hot air cooled by said main exchanger which supplies said turbine; and
   a pipe for distributing water extracted by said extraction loop, which pipe extends between said water extraction loop and said ram-air channel, upstream of said main exchanger, in order to be able to spray the water extracted by said water extraction loop, comprising spray water, into the ram-air flow of said ram-air channel
   wherein said system further comprises means for heating the spray water, which said means for heating the spray water are arranged between said water extraction loop and said ram-air channel, upstream of said main cooling exchanger, so as to allow evaporation of the water sprayed into said ram-air channel, which helps to cool the ram air of said primary circuit of the main exchanger and to ensure cooling of the hot air of said primary circuit of said main exchanger.

2. The air conditioning system according to claim 1, wherein said air cycle turbine engine further comprises at least one compressor mechanically coupled to said turbine and to said energy-consuming wheel, said compressor comprising an air inlet connected to said air bleeder, and an air outlet connected to said main cooling exchanger, said primary circuit of said main exchanger being supplied with a flow of hot air from said compressor.

3. The air conditioning system according to claim 1, wherein said means for heating the water from said water distribution pipe comprise at least one heat exchanger, comprising a spray exchanger, comprising a cold circuit supplied with said water from said distribution pipe, and a hot circuit supplied with a source of hot fluid.

4. The air conditioning system according to claim 3, wherein said hot fluid circuit of said spray exchanger is a fuel circuit, an oil circuit, a circuit of a heat transfer fluid or an air circuit of the aircraft.

5. The air conditioning system according to claim 4, wherein said hot fluid circuit of said spray exchanger is an air circuit of the aircraft, wherein this air circuit is the primary air circuit of said main exchanger.

6. The air conditioning system according to claim 1, wherein said spray exchanger is integrated within said main cooling exchanger.

7. The air conditioning system according to claim 6, wherein said main cooling exchanger comprises:
   a plurality of channels, comprising secondary channels, placed one on top of the other and intended for the circulation of said cold air, each extending in the same direction, comprising a secondary direction, between an air inlet, referred to as the secondary air inlet, and an air outlet, comprising a secondary air outlet;
   a plurality of channels, comprising primary channels, for the circulation of said hot air, each interposed between two secondary channels and extending in the same direction, comprising a primary direction, which is different from said secondary direction, between an air inlet, comprising a primary air inlet, and an air outlet, comprising a primary air outlet, so as to allow heat exchanges between the primary air of said primary channels and the secondary air of said secondary channels;

water circulation channels, each extending adjacently to a secondary channel in said secondary direction in the vicinity of the primary air outlets, between a water inlet, which is fluidically connected to said water distribution pipe, and a water outlet, so as to allow this water to be heated by heat exchanges with said primary air flow of said primary channels; and water-spray micro-perforated hollow bars, each extending adjacently to a primary channel in said primary direction, between a water inlet, which is fluidically connected to at least one water outlet of said water circulation channels, and water-spray micro-perforations leading toward the secondary air inlets, so as to allow evaporation of the heated water sprayed at the inlet of said secondary channels, which thus helps to cool the secondary air flow at the inlet of the exchanger.

8. The air conditioning system according to claim 1, wherein said water extraction loop comprises:

a condenser comprising a primary air circuit supplied with the air flow at the outlet of said main cooling exchanger, in thermal interaction with a secondary air circuit supplied with an air flow from said turbine, to allow condensation of said air flow of said primary circuit; and a water extractor that is arranged at the outlet of said condenser and is designed to be able to recover the water condensed by the condenser and to feed said water to said water distribution pipe.

9. The air conditioning system according to claim 8, further comprising a heater comprising a primary air circuit supplied by said primary air circuit of said main cooling exchanger and supplying said primary air circuit of said condenser, in thermal interaction with a secondary circuit supplied with air from said water extractor so as to allow the compressed air supplying the primary circuit of said heater to be heated.

10. The air conditioning system according to claim 1, wherein the air bleeder is a device bleeding air from a propulsion engine of the aircraft or a device bleeding air from an auxiliary engine of the aircraft.

11. The air conditioning system according to claim 1, wherein said energy-consuming wheel is a fan designed to allow ram air to circulate in said ram-air circulation channel.

12. An air transport vehicle or rail transport vehicle comprising a cabin and an air conditioning system for the cabin, wherein said air conditioning system for the cabin is a system comprising:

an air bleeder adapted to bleed air from an air source;

an air cycle turbine engine comprising at least one turbine and an energy-consuming wheel mechanically coupled to one another, said turbine comprising an air inlet and an air outlet that is connected to said cabin in order to be able to supply said cabin with air at a controlled pressure and temperature;

at least one heat exchanger, comprising a main cooling exchanger, which is arranged in a channel for circulation of ram air drawn from outside the aircraft, between said air bleeder and said air inlet of said turbine, said main exchanger comprising a primary circuit supplied with a flow of hot air from said air bleeder, and a secondary circuit supplied with said ram air, which forms a flow of cold air for cooling said flow of hot air;

a water extraction loop that is arranged between said main exchanger and said turbine and is designed to extract water from the flow of hot air cooled by said main exchanger which supplies said turbine; and a pipe for distributing water extracted by said extraction loop, which pipe extends between said water extraction loop and said ram-air channel, upstream of said main exchanger, in order to be able to spray the water extracted by said water extraction loop, comprising spray water, into the ram-air flow of said ram-air channel;

wherein said system further comprises means for heating the spray water, which said means for heating the spray water are arranged between said water extraction loop and said ram-air channel, upstream of said main cooling exchanger, so as to allow evaporation of the water sprayed into said ram-air channel, which helps to cool the ram air of said primary circuit of the main exchanger and to ensure cooling of the hot air of said primary circuit of said main exchanger.

* * * * *